United States Patent [19]

Schmack et al.

[11] Patent Number: 4,481,621

[45] Date of Patent: Nov. 6, 1984

[54] SERVICE INTEGRATED DIGITAL SIGNAL TRANSMISSION SYSTEM

[75] Inventors: Hans-Jürgen Schmack, Allmersbach; Erich Rauth, Auenwald, both of Fed. Rep. of Germany

[73] Assignee: Licentia Patent-Verwaltungs-GmbH, Frankfurt am Main, Fed. Rep. of Germany

[21] Appl. No.: 324,662

[22] Filed: Nov. 24, 1981

[30] Foreign Application Priority Data

Nov. 27, 1980 [DE] Fed. Rep. of Germany ....... 3044605

[51] Int. Cl.$^3$ .............................................. H04B 9/00
[52] U.S. Cl. ...................................... 370/3; 455/607; 455/612; 370/4
[58] Field of Search ............... 455/2, 5, 606, 607, 455/608, 610, 612, 617, 618; 370/1, 3, 71, 73, 4; 371/66; 358/84, 85; 364/200 MS File, 900 MS File; 375/58

[56] References Cited

U.S. PATENT DOCUMENTS

| | | | |
|---|---|---|---|
| 3,453,601 | 7/1969 | Boggrt et al. | 364/200 |
| 3,651,471 | 3/1972 | Haselwood et al. | 455/2 |
| 3,940,566 | 2/1976 | Jeppsson et al. | 179/15 BP |
| 3,941,989 | 3/1976 | McLaughlin et al. | 364/900 |
| 4,061,577 | 12/1977 | Bell | 370/3 |
| 4,132,867 | 1/1979 | Siglow . | |

FOREIGN PATENT DOCUMENTS

| | | |
|---|---|---|
| 2444908 | 3/1976 | Fed. Rep. of Germany . |
| 2538638 | 3/1977 | Fed. Rep. of Germany . |
| 2657365 | 3/1978 | Fed. Rep. of Germany . |
| 2843088 | 4/1980 | Fed. Rep. of Germany . |
| 2820428 | 9/1980 | Fed. Rep. of Germany . |

OTHER PUBLICATIONS

The International Symposium on Subscriber Loops and Services, Mar. 1978, pp. 39–43, Helliwell and Kent, "Optical Fibre Transmission Developments and the Local Loop".

Personik et al., "Contrasting Fiber-Optic-Component-Design Requirements in Telecommunications, Analog, and Local Data Communications Applications" in *Proceedings of the IEEE* vol. 68, No. 10, Oct., 1980, pp. 1254–1262.

Chown et al., "Direct Modulation of Double-Heterostructure Lasers at Rates up to 1 Gbit/s" in *Electronic Letters* vol. 9, No. 2, Jan. 25th, 1973 pp. 34–36.

Kawasaki et al., "Low-Loss Access Coupler for Mulitmode Optical Fiber Distribution Networks" in *Applied Optics*, vol. 16, No. 7, Jul., 1977, pp. 1794 to 1795.

Hirschmann et al., "Basic Principles of Digital Subscriber Sets" in *IEEE Transactions on Communications* vol. Com. 29, No. 2, Feb., 1981, pp. 173 to 177.

(List continued on next page.)

*Primary Examiner*—Joseph A. Orsino, Jr.
*Attorney, Agent, or Firm*—Spencer & Frank

[57] ABSTRACT

A service integrated, time multiplex digital signal transmission system for transmitting narrowband and broadband signals between a central exchange terminal and a subscriber terminal, which system includes a optical fiber waveguide path connected between the terminals, a transmitter device at one terminal composed of sources of such narrowband and broadband signals and multiplexers connected for combining the signals provided by the sources into a multiplex signal and for supplying such multiplex signal to the optical fiber waveguide path, and a receiver device at the other terminal composed of demultiplexers connected to the optical fiber waveguide path for receiving multiplex signals from that path and separating the received multiplex signals into narrowband signals and broadband signals. The device at the subscriber terminal is normally supplied with operating power by local utility mains. The system further includes a charge accumulator for supplying operating power independently of the local mains, connected for supplying such power to the device at the subscriber terminal in the event of interruption of the power supply provided by the local mains, and devices connected for switching the system to effect signal transmission at a reduced bit rate in the event of such local mains power interruption.

10 Claims, 5 Drawing Figures

OTHER PUBLICATIONS

Bosik "The Case in Favor of Burst-Mode Transmission for Digital Subscriber Loops" in JSSLS 80, pp. 26-30.

Bauch "Future Communication Technology Using Optical Conductors" 1979, pp. 150-153.

Pooch et al., "Richtfunktechnik" in Fachverlag Schiele & Schön GmbH-Berlin 1974, pp. 269 to 284.

Cotten et al.—Fiber Optic Digital Video Systems for Commercial Cable TV Trunking Applications—SPIE vol. 139 Guided Wave Optical Systems and Devices (1978) pp. 53-62.

Welzenbach et al—The Application of Optical Systems for Cable TV—NTG Fachber vol. 13 (1980) pp. 46-50.

Miki et al—Two Way WDM Transmission—Euro. Conf. on Optical Comm. 4th(Genoa, Italy) pp. 646-653.

Hinoshita—Optical Fiber Two Way/WDM Video Transmission System—Conf. 3rd World Telecomm. Forum (Geneva, Switz.) 19-26, Sep., 1979—pp. 3.2.4/1-3.

4,481,621

SERVICE INTEGRATED DIGITAL SIGNAL TRANSMISSION SYSTEM

BACKGROUND OF THE INVENTION

The present invention relates generally to a service integrated digital time multiplexed transmission system and specifically to reducing the power requirements of a subscriber terminal in the event of a commercial power outage.

German Offenlegungsschrift [Laid-open Application] No. 2,538,638 discloses an intergrated communications system for the transmission and switching of video, audio and data signals between a central exchange and a subscriber terminal. The subscriber terminal is connected to the central exchange by means of two separate glass fibers, one fiber being used for transmission and the other for reception of telephone and video signals in time multiplex.

U.S. Application Ser. No. 155,132, filed May 30, 1980 now U.S. Pat. No. 4,491,180 by Hans Schüssler discloses a service integrated communications transmission and switching system for audio, video and data signals in which only one light conductive fiber is used for the subscriber terminal line. Narrowband services are provided by means of digital transmission in time multiplex mode at the subscriber and the broadband services are provided by means of analog transmission.

In neither of the above systems in there any disclosure relating to the current supply for the devices at the subscriber's terminal. In present-day transmission systems, the devices at the subscriber's terminal are fed by the central exchange battery or power supply through connecting lines to the subscriber. In future optical transmission systems, it will probably not be possible to continue supplying power from the central exchange, since the addition of copper wires in the glass fiber cable constitutes a technical regression and the transmission of electrical energy over a distance of many kilometers by optical means would create power loss and other problems.

SUMMARY OF THE INVENTION

It is an object of the present invention to provide a service integrated digital transmission system of the type in which the current is not supplied from the central exchange and the system still maintains a user availability.

It is an additional object of the present invention to provide a transmission system in as inexpensive and energy saving manner as possible.

It is a further object of the present invention to automatically sense an interruption in commercial power, reduce the bit rate by terminating broadband transmission and operating only by narrowband transmission at the subscriber terminal.

The above and other objects are achieved by providing a switching system which upon sensing a commercial power reduction or outage deactivates the subscriber broadband transmission, and connects the narrowband transmission system to transmit narrowband data at a reduced bit rate.

The transmission system according to the present invention has the advantage that, because the subscriber's device is supplied with current from the commercial power supply mains, the expensive addition of copper to the glass fiber cable can be avoided. In the event that there is an interruption of utility, or commercial power, the charge accumulator can take over the current supply to the system and thus the availability of the transmission system is not interfered with in any way. Upon interruption of the commercial power, transmission takes place at a reduced bit rate. For example, instead of the high bit rate present during broadband operation, with its associated high current drain, transmission takes place at the low bit rate of the narrowband operation and the devices at the subscriber's terminal designed for broadband services (reception and transmission), which consume the major portion of the current, can be disconnected. Therefore, considerably smaller loads are placed on the charge accumulator, and long utility power interruptions can be accommodated without service interruption.

According to one advantageous embodiment of the present invention, the charge accumulator is a commercial power buffered battery.

According to a further feature of the invention, an alarm is generated when there is an interruption of the commercial power and this alarm is transmitted to the central exchange as a narrowband signal where it is received and can be utilized for switching the system.

According to another feature of the invention, the optical fiber waveguide system at the subscriber's terminal includes two parallel connected optical receivers, one being intended for broadband services and the other for narrowband services. Since the broadband receiver requires more energy than the narrowband receiver, which is for example a PIN diode, the broadband receiver is likewise switched off when there is an interruption in the commercial power.

DESCRIPTION OF THE PREFERRED EMBODIMENTS

Figure 1:
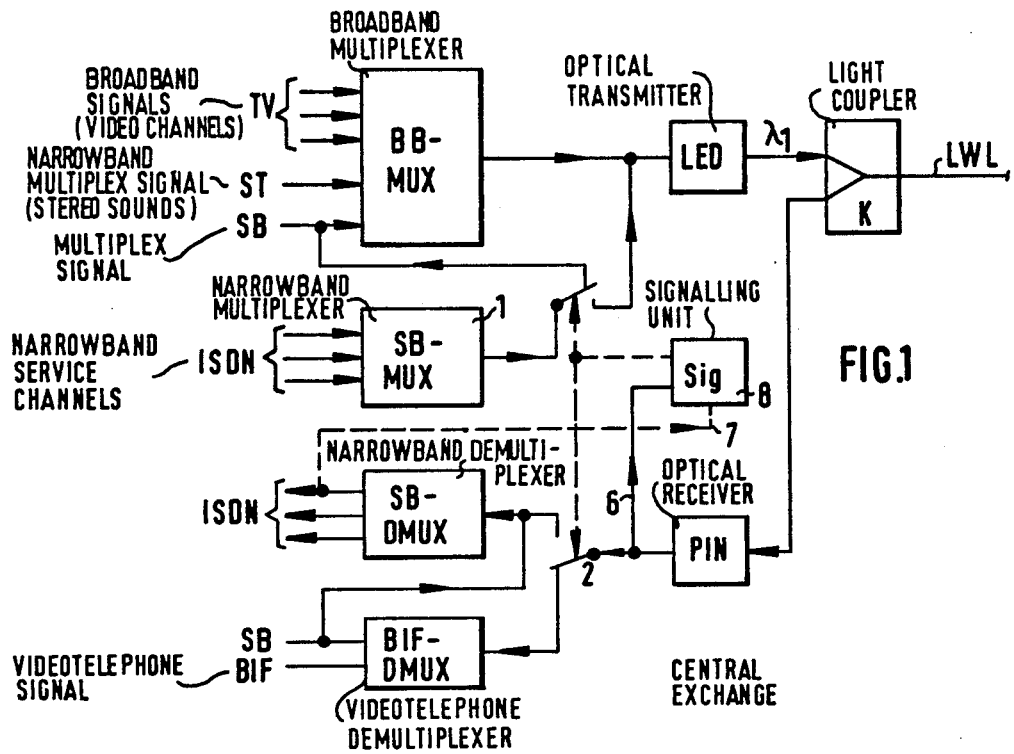
FIG. 1 is an electronic block diagram of a preferred embodiment according to the invention of the transmission and reception devices in the central exchange.

FIG. 1 shows a broadband multiplexer BB-MUX connected to form a broadband multiplex signal from three television channels, one narrowband multiplex signal ST from stereo sounds and one narrowband multiplex signal SB which itself can be formed from the signals on narrowband service channels ISDN by means of a narrowband multiplexer SB-MUX.

The output signal of the broadband multiplexer BB-MUX is fed to the optical transmitter at the central exchange, the optical transmitter here being a light-emitting diode LED, whose output is supplied, via a light coupler K, to the optical fiber waveguide LWL.

Figure 2:
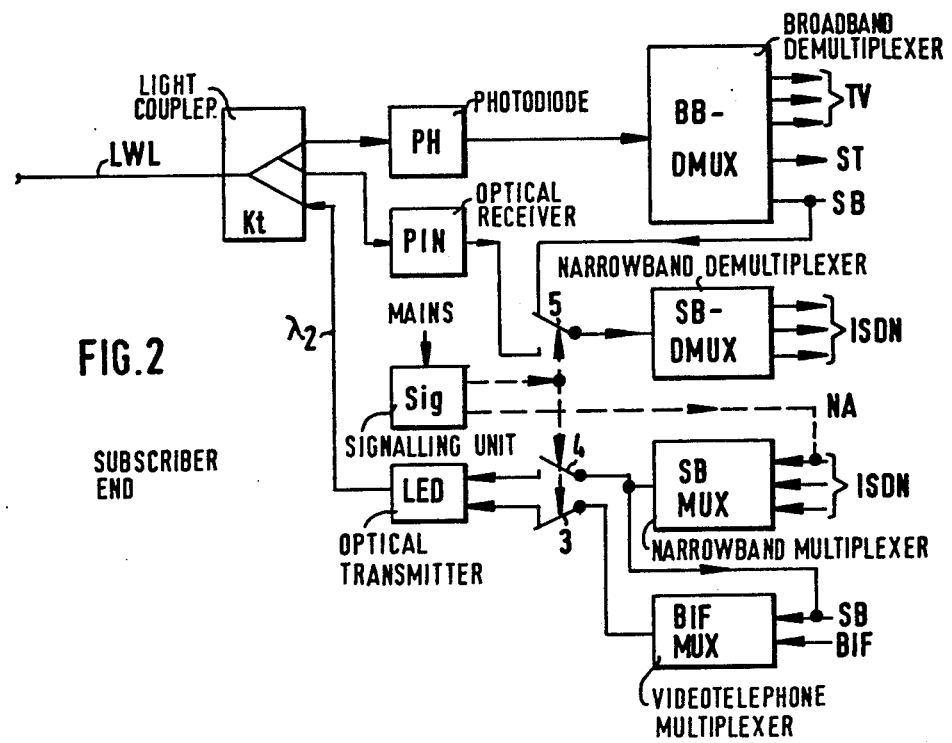
FIG. 2 is an electronic block diagram of the transmission and reception devices at the subscriber's terminal for the same embodiment.

FIG. 2 shows the end of the optical fiber waveguide LWL connected to the subscriber's terminal via a light coupler Kt. One output of the light coupler Kt is connected to an optical receiver, which is here a photodiode PH, whose output leads to a broadband demultiplexer BB-DMUX and in which the received signal is demultiplexed into the original individual broadband channels. The three television channels and the stereo sound channels ST can be obtained directly while the narrowband multiplex signals SB are demultiplexed by means of a narrowband demultiplexer SB-DMUX into the individual ISDN channels.

For transmission, the subscriber terminal as shown in FIG. 2 is equipped with a narrowband multiplexer SB-MUX with which the ISDN channels are combined into a narrowband multiplex signal SB and with a videotelephone multiplexer BIF-MUX which combines signal SB with a videotelephone channel signal BIF and delivers the resulting combined multiplex signal to an optical transmitter, here a light-emitting diode LED producing a light wavelength λ2. The light signal produced by diode LED is supplied via the light coupler Kt to the optical fiber waveguide LWL.

FIG. 1 shows the received signal path from the optical fiber waveguide LWL via the light coupler K to an optical receiver, here a PIN diode. The output of the receiver PIN is connected to a videotelephone demultiplexer BIF-DMUX. The latter furnishes the videotelephone signal BIF and the narrowband multiplex signal SB which itself is separated by a narrowband demultiplexer SB-DMUX into the individual ISDN channels.

For switching the system to narrowband operation in the event of a main power failure, according to the invention, the central exchange terminal of FIG. 1 is provided with switches 1 and 2, while the subscriber exchange terminal of FIG. 2 is provided with switches 3, 4 and 5. In normal operation, when operating power is being supplied by the mains, switches 1, 2 and 5 are in the positions illustrated, switch 4 is open and switch 3 is closed to connect the output of multiplexer BIF-MUX to transmitter LED.

According to the invention, the subscriber terminal is further provided with a charge accumulator which may be of a conventional type and which provides the current supply in the event of a commercial power interruption. FIG. 2 shows a commercial power signalling unit Sig which provides an alarm signal on a line NA to the central exchange, via one channel supplying the multiplexer SB-MUX in the subscriber terminal, if there is an interruption in the commercial power. Then, signalling unit Sig, possibly after receiving an acknowledgment from the central exchange, actuates the switches 3, 4 and 5.

This actuation would involve moving switch 5 to the position opposite that illustrated, while closing switch 4 and opening switch 3. Thus the output of the videotelephone multiplexer BIF-MIX is disconnected from the subscriber terminal optical transmitter LED and the narrowband multiplexer SB-MUX is connected directly to the input of that optical transmitter.

After transmission over the optical fiber waveguide path LWL, the narrowband multiplexed signal SB is received by the optical receiver PIN and separated into the individual ISDN channels by channel demultiplexing in the narrowband demultiplexer SB-DMUX after initial demultiplexing in videotelephone demultiplexer BIF-DMUX.

A commercial power interruption alarm signal is recognized in the central exchange by the signalling unit Sig which then controls switch 2 to the output of the optical receiver PIN from the videotelephone demultiplexer BIF-DMUX directly to the input of the narrowband demultiplexer SB-DMUX thus effecting a change to the lower bit rate of narrowband operation from the subscriber to the central exchange.

In the return direction at the central exchange in FIG. 1 switching of the output of the narrowband multiplexer SB-MUX directly to the input of the optical transmitter LED, by operation of switch 1 and, at the subscriber's end in FIG. 2, directly connecting the input of the narrowband demultiplexer SB-DMUX to the output of the second optical reciever PIN, which is likewise connected with the optical fiber waveguide LWL via the photocoupler Kt at the subscriber's end, accommodates the system to the lower bit rate of narrowband operation.

The functionally separated devices for broadband transmission at the subscriber's end are disconnected so that a considerable savings in current consumption is realized.

The system according to the present invention has the further advantages that it can be modularly expanded, beginning with a first stage which includes telephone and other narrowband services, through a second stage in which broadband distribution such as television is added to a third stage which also includes videotelephone transmission/reception.

In the second and third stages the bit rate can be used and evaluated as the alarm criterion in the signalling unit Sig, in which the received multiplex signal is fed in from PIN-output via connecting line 6, eliminating the need for a separate alarm generation or alarm inclusion in an ISDN channel.

The illustrated embodiment of the invention operates with wavelength multiplexing with a first wavelength λ1, being, for example 1.3μ, the second wavelength 80 2, being for example 1.5μ. The invention is of course not limited to such wavelength multiplex methods but can also operate according to the burst-mode-transmission, thus eliminating the need for optical couplers. Burst-mode-transmission is described in "The case in favor of burst-mode-transmission for digital subscriber loops" by Bosik in JSSLS 80, NTG Fechberichte, 73, pp. 26–30.

Figure 3:
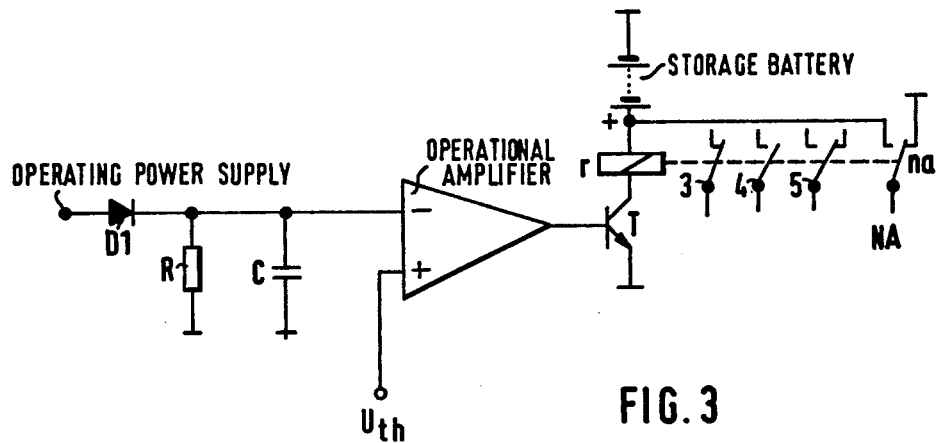
FIGS. 3 and 4a, 4b show a preferred embodiment of the signalling unit Sig at the subscriber's terminal and in the central exchange, respectively.

FIG. 3 shows a preferred embodiment of the signalling unit Sig at the subscriber's terminal. The operating power supply is rectified by diode D1 and integrated by an integration circuit R,C. The integrated signal is compared with a threshold voltage $U_{th}$ by an operational amplifier; if it is smaller a transistor T is switched on, activating a relay r, by which switches 3, 4, 5 and na are activated. The device is supplied by a storage battery (charge accumulator).

Figure 4A:
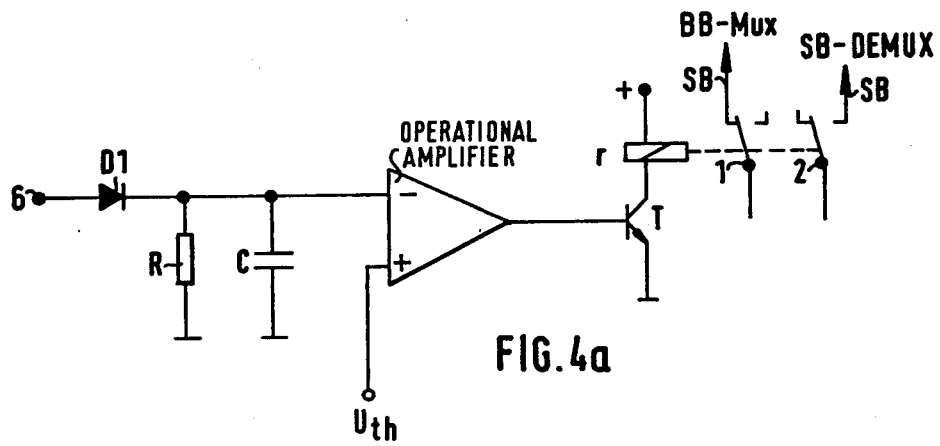
Figure 4B:
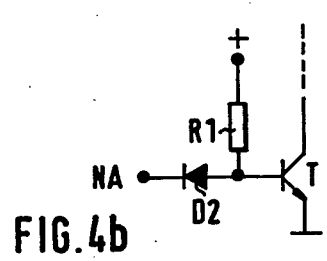

FIGS. 4a, 4b show a preferred embodiment of the signalling unit Sig in the central exchange. In FIG. 4a a similar device is to be recognized as in FIG. 3. Instead of operating power supply the received electrical multiplex signal is applied to the input of Sig (via line 6) and handled. Normally it contains the high bit rate of broadband multiplex signal. Mains failure in the subscriber's terminal effects the low bit rate of only narrowband multiplex signal, so voltage at the negative input of operational amplifier is much smaller than $U_{th}$ and transistor T, relay r and switches 1, 2 are activated.

If subscriber's terminal is not provided for transmitting broadband signals, the signalling unit Sig can be a simple device like in FIG. 4b. Mains failure in the subscriber's terminal effects transmitting alarm signal NA to the central exchange via one preselected ISDN-channel. There the received alarm signal NA is fed to the transistor T via a gate consisting of a diode D2 and a resistor R1, activating transistor T, relay r and switches 1, 2 as abovedescribed.

The optical receivers are described in "Contrasting Fiber-Optic-Component-Design Requirements . . . " by Personick in Proceedings of the IEEE, Vol. 68, No. 10, pp. 1254–1262. The optical transmitters are specified in "Direct Modulation of DHS-Lasers" by Chown in Electronics letters 1973 Vol. 9, No. 2, pp. 34–36. Optical couplers are described in Applied Optics Vol. 16, No. 7, 1977 pp. 1794–1795. The broadband multiplexer and demultiplexer (for television, videotelephone, etc.) can be specified in CCITT-Recommandation G 751, if the broadband signals each have a bit rate of 34 Mbit/s. The narrowband multiplexers and demultiplexers can be realized as show in IEEE Com.—29 No. 2, 1981, pp. 173–177.

It will be understood that the above description of the present invention is susceptible to various modifications, changes and adaptations, and the same are intended to be comprehended within the meaning and range of equivalents of the appended claims.

What is claimed is:

1. In a service integrated, time multiplex digital signal transmission system for transmitting narrowband and broadband signals between a central exchange terminal and a subscriber terminal, which system includes means defining an optical fiber waveguide path connected between the terminals, a transmitter device at one terminal composed of sources of such narrowband and broadband signals and multiplexing means connected for combining the signals provided by the sources into a multiplex signal and for supplying such multiplex signal to the optical fiber waveguide path, and a receiver device at the other terminal composed of demultiplexing means connected to the optical fiber waveguide path for receiving multiplex signals from that path and separating the received multiplex signals into narrowband signals and broadband signals, the improvement wherein said device at said subscriber terminal is normally supplied with operating power by local utility mains, and said system further comprises: a charge accumulator for supplying operating power independently of the local mains, connected for supplying such power to said device at said subscriber terminal in the event of interruption of the power supply provided by the local mains; first switching means at said one terminal connected to said multiplexing means and arranged to produce a switching signal for causing said multiplexing means to supply a signal at a reduced bit rate; and second switching means at said other terminal connected to said demultiplexing means and arranged to produce a switching signal for causing said demultiplexing means to process the signal at a reduced bit rate; with that one of said switching means which is at said subscriber terminal being connected to produce its switching signal in response to a local mains power interruption and that one of said switching means which is at said central exchange terminal being connected to produce its switching signal in response to an indication, transmitted via said waveguide path, of production of the switching signal by said switching means at said subscriber terminal, whereby said system is switched to effect signal transmission at a reduced bit rate in the event of such local mains power interruption.

2. A system as defined in claim 1, wherein said transmitter device and said receiver device comprise component groups for broadband signal transmission and for narrowband signal transmission, and said first and second switching means comprise means for restricting operation to only said component groups for narrowband signal transmission in the event of such local mains power interruption.

3. A system as defined in claim 2 wherein: said signal sources include sources of a plurality of narrowband signals and a plurality of broadband signals; said multiplexing means comprise a narrowband multiplexer connected for combining the plurality of narrowband signals into a narrowband mulitplex signal and a broadband multiplexer normally connected for combining the plurality of broadband signals and the narrowband multiplex signal into a broadband multiplex signal; said demultiplexing means comprise a broadband demultiplexer connected for separating broadband signals from the narrowband multiplex signal of the broadband multiplex signal and a narrowband demultiplexer normally connected for demultiplexing the narrowband multiplex signal into individual narrowband signals; and said operation restricting means are operatively arranged for responding to a local mains power interruption by connecting the output of said narrowband multiplexer and the input of said narrowband demultiplexer directly to said optical fiber waveguide path.

4. A system defined in claim 3 wherein a said transmitter device and a said receiver device are provided at each said terminal and said switching means operate to supply only said narrowband means at said subscriber terminal with operating power from said accumulator in the event of such local mains power interruption.

5. A system as defined in claim 1 wherein said charge accumulator is a battery connected to be charged by power supplied by the local mains.

6. A system as defined in claim 1 wherein said switching means located at said subscriber terminal comprise means connected for transmitting the switching signal to said central exchange terminal, via said optical fiber waveguide path, as a narrowband signal.

7. A system as defined in claim 1 wherein said receiver device is located at said subscriber terminal and comprises two light signal receivers having their inputs connected to said optical fiber waveguide path.

8. A system as defined in claim 1 wherein said receiver device comprises a light signal receiver composed of a PIN diode connected to said optical fiber waveguide path.

9. A system as defined in claim 1 wherein signals are transmitted over said light conductor path according to the wavelength multiplex technique.

10. A system as defined in claim 1 wherein signals are transmitted over said optical fiber waveguide path according to the burst-mode-transmission.

* * * * *